United States Patent
Boden et al.

(10) Patent No.: US 9,276,857 B2
(45) Date of Patent: Mar. 1, 2016

(54) METHOD AND APPARATUS FOR SCHEDULING PACKETS FOR TRANSMISSION IN A NETWORK PROCESSOR HAVING A PROGRAMMABLE PIPELINE

(71) Applicant: Marvell International Ltd., Hamilton (BM)

(72) Inventors: Kurt Thomas Boden, Strangas (SE); Jakob Carlstrom, Uppsala (SE)

(73) Assignee: Marvell International Ltd., Hamilton (BM)

( * ) Notice: Subject to any disclaimer, the term of this patent is extended or adjusted under 35 U.S.C. 154(b) by 495 days.

(21) Appl. No.: 13/890,593

(22) Filed: May 9, 2013

(65) Prior Publication Data

US 2013/0258845 A1    Oct. 3, 2013

Related U.S. Application Data

(63) Continuation of application No. 13/170,427, filed on Jun. 28, 2011, now Pat. No. 8,442,056.

(51) Int. Cl.
*H04L 12/28*    (2006.01)
*H04L 12/801*    (2013.01)
*H04L 12/935*    (2013.01)

(52) U.S. Cl.
CPC ............ *H04L 47/12* (2013.01); *H04L 49/3063* (2013.01)

(58) Field of Classification Search
CPC ................ H04Q 11/0407; H04Q 2213/13003; H04Q 11/0428; H04Q 11/0471; H04L 49/254; H04L 49/255; H04L 12/5601; H04L 2012/5609; H04L 49/256; H04L 49/1553; H04L 12/56; H04L 2012/56
USPC .............. 370/360, 359, 396, 398, 395.4, 401, 370/402, 419, 423

See application file for complete search history.

(56) References Cited

U.S. PATENT DOCUMENTS

| | | | | |
|---|---|---|---|---|
| 5,502,718 | A * | 3/1996 | Lane et al. | 370/414 |
| 6,052,368 | A * | 4/2000 | Aybay | 370/357 |
| 6,715,021 | B1 * | 3/2004 | Paul et al. | 710/310 |
| 6,813,266 | B1 * | 11/2004 | Chiang et al. | 370/389 |
| 7,167,485 | B2 | 1/2007 | Hrabik et al. | |
| 2005/0058137 | A1 | 3/2005 | Carlson et al. | |
| 2008/0209186 | A1 | 8/2008 | Boden | |
| 2009/0183164 | A1 | 7/2009 | Carlstrom | |

* cited by examiner

*Primary Examiner* — Brenda H Pham

(57) ABSTRACT

A network processor includes an arbitration device, a processing device, and a pipeline. The arbitration device receives a first packet and a second packet. The second packet includes a first control message. The pipeline includes access devices, where the access devices include first and second access devices. The pipeline, based on a clock signal, forwards the first and second packets between successive ones of the access devices. The arbitration device: sets a timer based on at least one of (i) an amount of time for data to travel between the first and second access devices, or (ii) a number of pipeline stages between the first and second access devices; adjusts a variable based on (i) the clock signal, and (ii) transmission of the first packet from the arbitration device to the pipeline; and based on the timer and the variable, schedules transmission of the second packet through the pipeline.

20 Claims, 4 Drawing Sheets

METHOD AND APPARATUS FOR SCHEDULING PACKETS FOR TRANSMISSION IN A NETWORK PROCESSOR HAVING A PROGRAMMABLE PIPELINE

CROSS-REFERENCE TO RELATED APPLICATIONS

The present disclosure is a continuation of U.S. patent application No. 13/170,427 (now U.S. Pat. No. 8,442,056), filed on Jun. 28, 2011. The entire disclosure of the application referenced above is incorporated herein by reference.

FIELD

The disclosed embodiments generally relate to packet-processing systems for communications networks. More specifically, the disclosed embodiments relate to a method and an apparatus for scheduling both control message packets and traffic packets in a packet-processing pipeline.

BACKGROUND

Network processors often include a programmable pipeline to facilitate processing a stream of packets at high data rates, for example up to 100 gigabits per second. A programmable pipeline is often associated with one or more "processing engines" that perform various packet-processing operations, such as accessing a lookup table. Moreover, a programmable pipeline typically interacts with an engine through one or more engine access points (EAPs) located at various stages of the pipeline. For example, an EAP can be used to send a request on behalf of a packet to a packet-processing engine, and to receive a corresponding response which can be integrated into the packet description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An engine is typically accessed by normal "traffic packets" to perform table lookups. In contrast, the engine is less frequently accessed by control-message (CM) packets to perform more time-consuming table-management operations. In order to maximize pipeline throughput, it is desirable to allow traffic packets to use as much of the engine's capacity as possible. Also, because CM packets are comparatively rare, it is undesirable to reserve engine capacity just to service these packets. In normal situations, traffic packets only achieve a 100% load for short periods of time. In other words, there are commonly gaps (unused capacity) in a stream of traffic packets. Hence, it is desirable for the engine to use these gaps to process requests for CM packets. However, using these gaps for CM packets involves performing queuing operations, and because queues are bounded in size it is important to ensure that no traffic packets or CM packets will be dropped because of queue overflow conditions.

However, it is complicated to ensure against queue overflow conditions because the mix between traffic packets and CM packets is typically controlled by an arbiter at the entrance to the programmable pipeline. Once a packet enters the pipeline, the packet proceeds through all of the pipeline stages without stalling. The engine has no other connection to the arbiter. (Note that because of the high pipeline speeds and the relatively large propagation delay between the engine and the arbiter, it is impractical to send feedback signals from the engine to the arbiter.)

A technique disclosed in U.S. patent application Ser. No. 11/722,470 (entitled "Method for Reducing Buffer Capacity in a Pipeline Processor," by the same inventors as the instant application, filed 28 Nov. 2007) ensures against queue overflow by letting one or more CM packets borrow engine capacity from the traffic packets, where the gaps in the traffic packets are used to regain the borrowed costs. Note that this borrowed engine capacity manifests itself as queue buildup, and this buildup needs to return to a low level, before new CM packets can be sent.

The above-described technique assumes that the location in the pipeline where you regain capacity (from gaps) is also the same location where you use the capacity (to service requests for traffic packets and CM packets). However, in many situations it is desirable for CM packets to use different engine access points (EAPs) from traffic packets. In this case, engine capacity is regained at different pipeline locations than where the capacity is used and the above-described technique may not operate properly.

Hence, what is needed is a method and an apparatus for scheduling packets to enter a programmable pipeline which operates in situations where CM packets and traffic packets access an engine from different pipeline locations.

SUMMARY

A network processor is provided and includes an arbitration device, a processing device, and a pipeline. The arbitration device is configured to receive a first packet and a second packet. The second packet includes a first control message. The pipeline includes access devices, where the access devices include a first access device and a second access device. The pipeline is configured to, based on a clock signal, forward the first packet and the second packet between successive ones of the access devices. The arbitration device is configured to: set a timer based on at least one of (i) an amount of time for data to travel between the first access device and the second access device, or (ii) a number of pipeline stages between the first access device and the second access device; adjust a variable based on (i) the clock signal, and (ii) transmission of the first packet from the arbitration device to the pipeline; and based on the timer and the variable, schedule transmission of the second packet through the pipeline.

In other features, a method is provided and includes receiving a first packet and a second packet, where the second packet includes a first control message. Based on a clock signal, the first packet and the second packet are forwarded between successive ones of access devices in a pipeline. The access devices include a first access device and a second access device. A timer is set based on at least one of (i) an amount of time for data to travel between the first access device and the second access device, or (ii) a number of pipeline stages between the first access device and the second access device. A variable is adjusted based on (i) the clock signal, and (ii) transmission of the first packet to the pipeline. Based on the timer and the variable, transmission of the second packet through the pipeline is scheduled.

The disclosed embodiments relate to a packet-processing system. This system includes an input which is configured to receive packets, where the packets include control-message (CM) packets and traffic packets. It also includes a pipeline to process the packets, where the pipeline includes access points for accessing an engine which services requests for packets, and where CM packets and traffic packets access the engine through different access points. The system additionally includes an arbiter to schedule packets entering the pipeline. While scheduling the packets, the arbiter is configured to account for empty slots in the pipeline to ensure that when CM packets and traffic packets initiate accesses to the engine through different access points, the accesses do not cause an overflow at an input queue for the engine.

In some embodiments, while scheduling the packets, the arbiter is configured to: initialize a resource shaper variable (RS) to zero; increment RS for each time interval; subtract a traffic-packet cost $C_T$ from RS for each traffic packet; subtract a CM-packet cost $C_{CM}$ from RS for each CM packet; and determine whether a CM packet can enter the pipeline based on the value of RS and an associated timer T.

In some embodiments, if an access point $A_{CM}$ for CM packets precedes an access point $A_T$ for traffic packets in the pipeline, the arbiter is configured to: (1) allow a previous CM packet which addresses the engine through $A_{CM}$ to enter the pipeline; (2) receive a next CM packet which also addresses the engine through $A_{CM}$; and (3) when RS reaches zero, start timer T, where T counts down a number of pipeline stages between $A_{CM}$ and $A_T$, and if T reaches 0 and if RS=0, allow the next CM packet to enter the pipeline. (The phrase "T counts down a number of pipeline stages" as used this specification and appended claims refers to a situation where T counts down for an amount of time corresponding to the number of pipeline stages. Note that the actual count can differ from the number of stages, for example if the timer operates with a clock frequency that differs from the clock frequency of the programmable pipeline.)

In some embodiments, if an access point $A_{CM}$ for CM packets follows an access point $A_T$ for traffic packets in the pipeline, the arbiter is configured to: (1) allow a previous CM packet which addresses the engine through $A_{CM}$ to enter the pipeline; (2) receive a next CM packet which also addresses the engine through $A_{CM}$; and (3) when RS reaches zero, allow the next CM packet to enter the pipeline; start timer T, where T counts down a number of pipeline stages between $A_T$ and $A_{CM}$; while T is running, freeze the value of RS so that RS does not change; and when T reaches zero, unfreeze the value of RS In some embodiments, the engine is configured to perform one or more of the following: a read operation into a lookup table; a write operation into a lookup table; a TCAM engine search; and a checksum computation.

In some embodiments, each access point in the pipeline is associated with a delay buffer of fixed length.

In some embodiments, the pipeline is configured to process packets continuously without stalling.

In some embodiments, the system also includes: one or more line interfaces; one or more system interfaces that support an optional connection to a switching core; and one or more packet buffers to facilitate internal switching within the packet-processing system.

In some embodiments, the pipeline can execute an ingress program for each ingress packet, and can execute an egress program for each egress packet. (Note that there can exist additional programs, for example "extended processing programs" which are executed for selected packets that re-circulate through the programmable pipeline.)

In some embodiments, the CM packets access the engine through one or more CM access points $A_{CMi}$ and the traffic packets access the engine through one or more traffic access points $A_{Ti}$ where the CM access points $A_{CMi}$ are different from the traffic access points $AT_i$.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Network Switch

Figure 1:
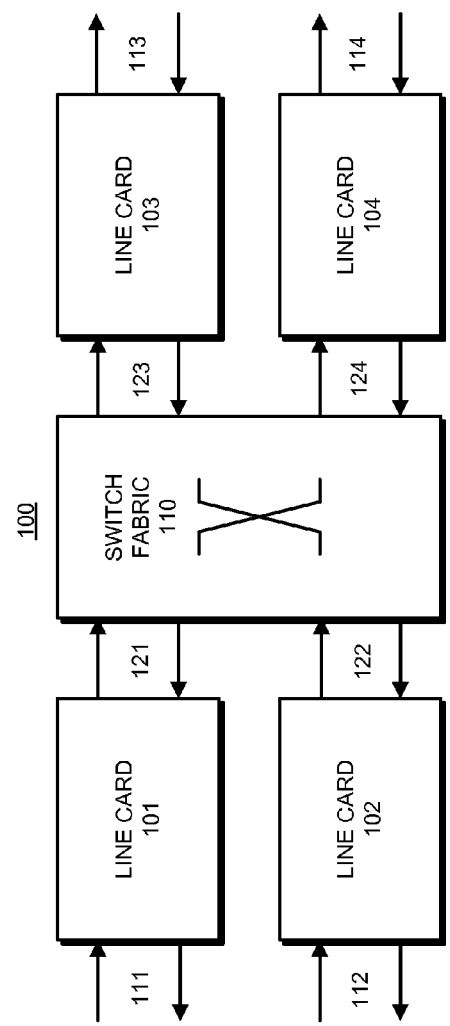
FIG. 1 illustrates a network router or switch in accordance with the disclosed embodiments.

FIG. 1 illustrates the structure of network router (or network switch) 100 in accordance with the disclosed embodiments. Network router/switch 100 includes a switch fabric 110, which is coupled to a number of line cards 101-104, through associated line card "system interfaces" 121-124. These line cards 101-104 are coupled to various communication lines (e.g., fiber optic links) through associated line card "line interfaces" 111-114.

Figure 2:
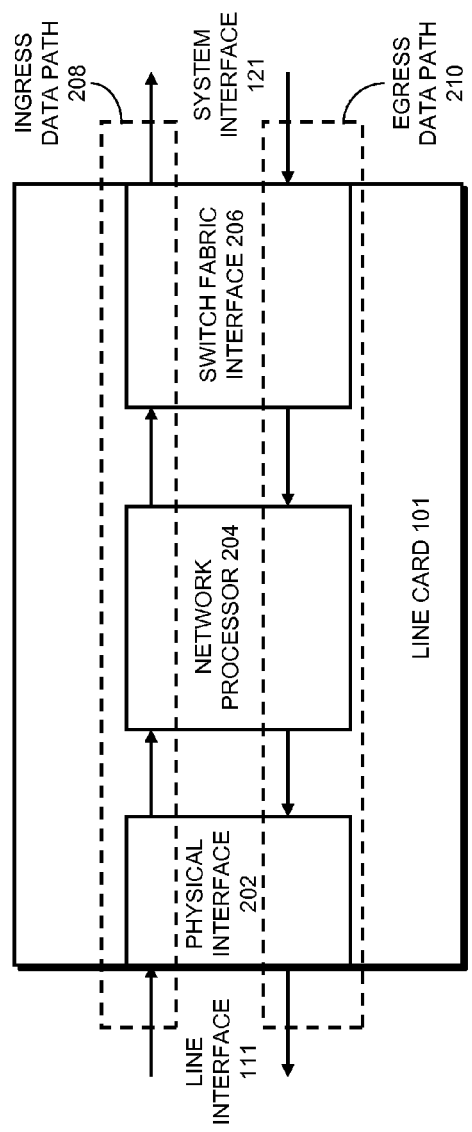
FIG. 2 illustrates a line card in accordance with the disclosed embodiments.

Referring to FIG. 2, line card 101 includes a physical interface 202 that contains circuitry to facilitate communications through line interface 111. Line card 101 also includes a switch fabric interface 206 that contains circuitry to facilitate communications through system interface 121. Physical interface 202 and switch fabric interface 206 are coupled to a network processor 204, which performs various packet-processing operations.

Note that line card 101 provides an "ingress data path" 208 for packets, which flows from line interface 111 through physical interface 202 and network processor 204, and then through switch fabric interface 206 and system interface 121 into switch fabric 110 (see FIG. 1). A corresponding "egress data path" 210 flows in the opposite direction from switch fabric 110 through system interface 121, then through switch fabric interface 206 and network processor 204, and then through physical interface 202 and line interface 111 to an associated communication channel.

Figure 3:
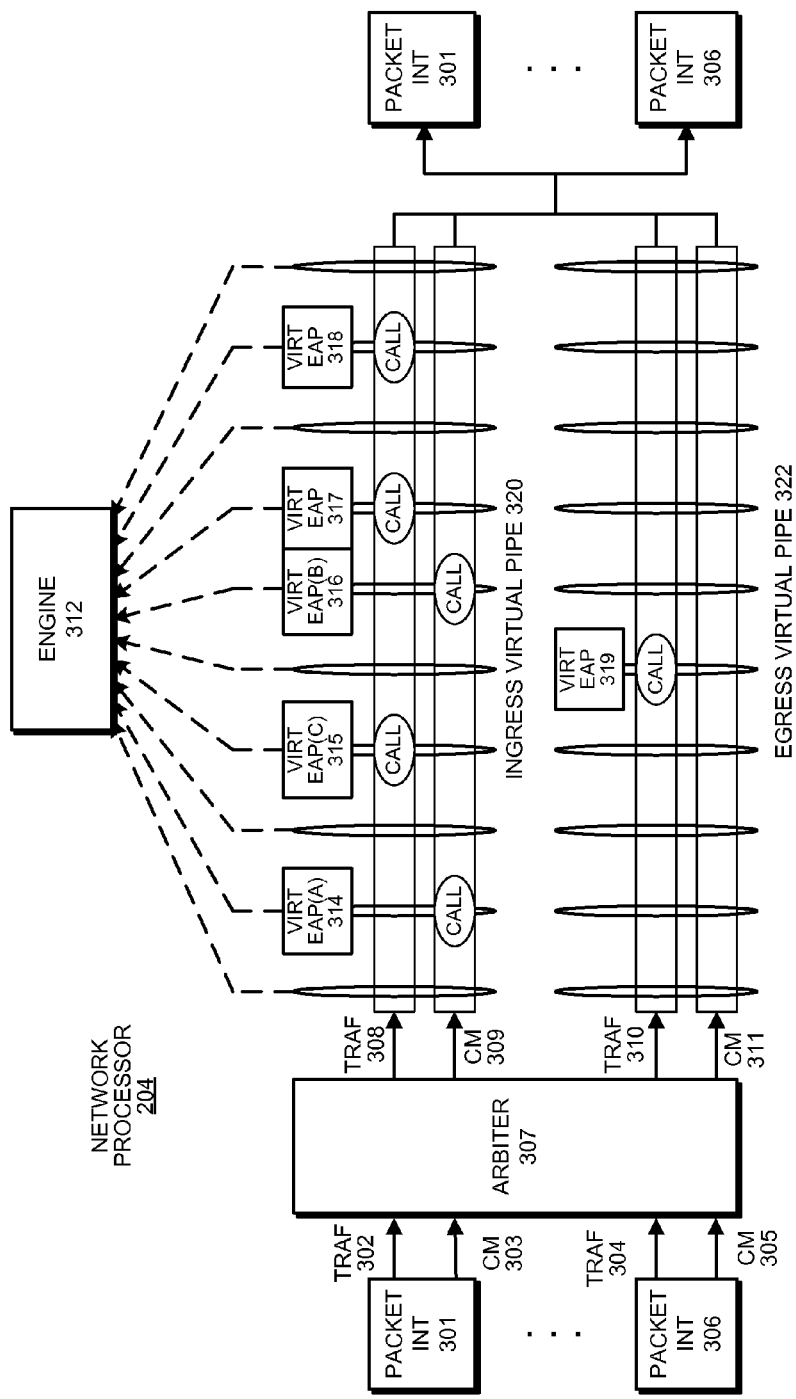
FIG. 3 illustrates a network processor in accordance with the disclosed embodiments.

FIG. 3 illustrates the internal structure of a network processor 204 in accordance with the disclosed embodiments. Network processor 204 includes a number of packet interfaces 301-306, which send and receive packets to physical interface 202 and switch fabric interface 206 in FIG. 2. (Although only two packet interfaces are shown, there can generally exist a larger number of packet interfaces.) Referring to the left-hand side of FIG. 3, traffic packets and CM packets from packet interfaces 301-306 feed into arbiter 307. More specifically, a stream of traffic packets 302 and a stream of CM packets 303 from packet interface 301 feed into arbiter 307. At the same time, a stream of traffic packets 304 and a stream of CM packets 305 from packet interface 306 feed into arbiter 307.

Arbiter 307 schedules these traffic and CM packets to produce a stream of traffic packets 308 and a stream of CM packets 309 for an ingress virtual pipeline 320, and also to produce a stream of traffic packets 310 and a stream of CM packets for an egress virtual pipeline 322. Note that ingress virtual pipeline 320 and egress virtual pipeline 322 actually flow through the same underlying physical pipeline (not shown). Also note that packets from the end of ingress virtual pipeline 320 and the end of egress virtual pipeline 322 flow back to packet interfaces 301-306.

The ingress virtual pipeline 320 and egress virtual pipeline 322 include a number of virtual engine access points (EAPs), which as mentioned above are specialized pipeline stages that facilitate sending a request on behalf of a packet to a packet-processing engine, and receiving a corresponding response. These virtual EAPs are represented by thin ovals in FIG. 3. Note that these virtual EAPs are associated with underlying physical EAPs, which are not shown. Also note that each EAP includes a fixed size delay buffer, which can be thought of as a shift register or a FIFO queue of fixed size.

The virtual EAPs access a shared engine 312 that can perform various packet-processing operations, such as accessing a lookup table. Engine 312 also includes a queue (not shown) for storing requests which are waiting to be processed by shared engine 312. (Note that there can exist multiple shared engines 312, each protected by a dedicated separate instance of a resource shaper.)

In the embodiment illustrated in FIG. 3, traffic packets make calls (requests) through different virtual EAPs than CM packets. More specifically, traffic packets make calls through virtual EAPs 315, 317 and 318 in ingress virtual pipeline 320 and virtual EAP 319 in egress virtual pipeline 322, whereas CM packets make calls through virtual EAPs 314 and 316 in ingress virtual pipeline 320.

Scheduling Packets

To reserve engine capacity for CM packets, older systems periodically send a non-executed control message (XCM) into the pipeline. An XCM passes through the pipeline and uses the same EAP as the traffic packets but does not execute any code. This ensures that a gap in traffic will periodically pass through the EAP, which provides additional time for the engine to process a preceding request from a CM packet.

Instead of sending XCMs, newer systems send CM packets containing programs, which can possibly send multiple read and write requests to an engine. In this case it is not possible to ensure that a CM packet will always use the same EAP as normal traffic packets. For example, referring to FIG. 3, in older systems, CM packets and traffic packets make calls through the same virtual EAP 315 (C). In this way, the system knows that when a gap in traffic passes through C, the queue at engine 312 will tend to decrease.

In newer systems, a CM packet contains a program which performs management operations, and this program does not call engine 312 through C. The program instead calls engine 312 from virtual EAP 314 (A) or virtual EAP 316 (B). However, there are time differences between A, B and C. Hence, if the program makes a call through A, the system cannot know if a gap in traffic that precedes the CM packet has reached C when the CM packet makes a call through A. On the other hand, if the program in the CM packet makes a call through B, a false gap may occur, where a gap in traffic that follows the CM packet may have already passed C when the CM packet makes a call through B.

This problem can be solved by using a timer in addition to the resource shaper (token bucket) described in U.S. patent Ser. No. 11/722,470 (cited above). This timer operates in two modes. In the case where the CM packet makes a call through A, the resource shaper counts to zero and then starts the timer to account for the difference in time between A and C. When this timer reaches zero and the resource shaper is zero, the system can let the CM packet into the pipeline. Note that when the resource shaper reaches zero, the system knows that enough gaps have passed through the pipeline interface to allow the engine to process the call through A. The system then starts the timer to account for the time difference between A and C. This ensures that all the gaps have reached C before the call is made through A.

For the case where the CM packet makes a call through B, the idea is to not count false gaps. This is accomplished as follows. When the resource shaper counts to zero, the system sends the CM packet and starts the timer, which counts down the difference in time between B and C. The system also freezes the resource shaper while this timer is running and does not unfreeze the resource shaper until the timer reaches zero. By freezing the resource shaper for the duration of the timer, the system does not count false gaps in the pipeline between B and C.

Figure 4:
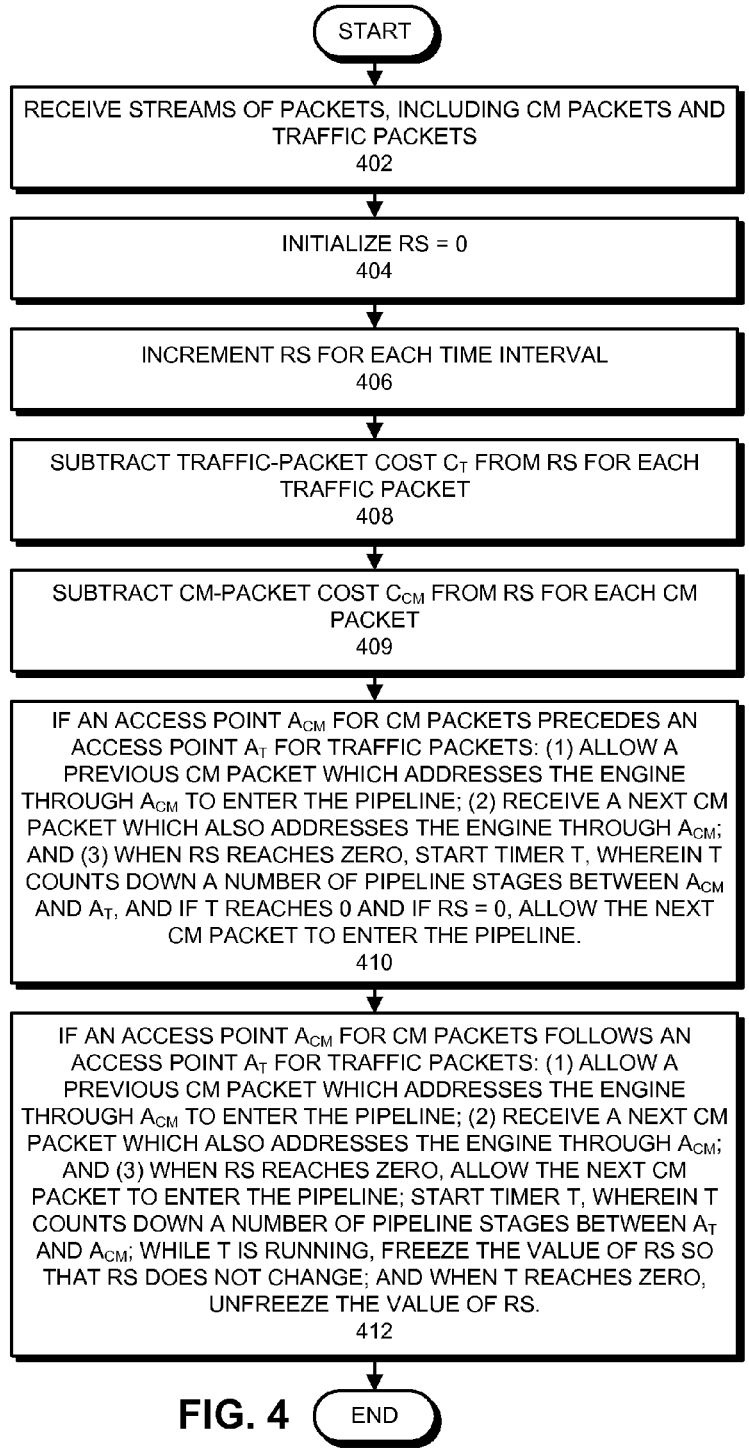
FIG. 4 presents a flow chart illustrating a process for scheduling CM packets in accordance with the disclosed embodiments.

The above-described scheduling process is described in more detail below with reference to the flow chart in FIG. 4. At the start of the process, the system (arbiter) receives one or more streams of packets including traffic packets and CM packets (step 402). Next, the system initializes the resource shaper variable (RS) to zero (step 404). During operation, the system then increments RS for each time interval (406). The system also subtracts a traffic-packet cost Ct from RS for each traffic packet (step 408) and subtracts a CM-packet cost Ccm from RS for each CM packet (step 409).

The system also determines whether a CM packet can enter the pipeline based on the value of RS and an associated timer T. In the case where an access point $A_{CM}$ for CM packets precedes an access point $A_T$ for traffic packets in the pipeline, the system: (1) allows a previous CM packet which addresses the engine through $A_{CM}$ to enter the pipeline; (2) receives a next CM packet which also addresses the engine through $A_{CM}$; and (3) when RS reaches zero, starts timer T, where T counts down a number of pipeline stages between $A_{CM}$ and $A_T$, and if T reaches 0 and if RS=0, allows the next CM packet to enter the pipeline (step 410).

In the case where the access point $A_{CM}$ for CM packets follows the access point $A_T$ for traffic packets in the pipeline, the system: (1) allows a previous CM packet which addresses the engine through $A_{CM}$ to enter the pipeline; (2) receives a next CM packet which also addresses the engine through $A_{CM}$; and (3) when RS reaches zero, allows the next CM packet to enter the pipeline; start timer T, where T counts down a number of pipeline stages between $A_T$ and $A_{CM}$; while T is running, freezes the value of RS so that RS does not change; and when T reaches zero, unfreezes the value of RS (step 412).

For example, assume that a traffic packet costs 5 cycles and a CM packet costs 50 cycles. In each clock cycle, the system increases RS by one, so every five clock cycles a traffic packet is sent and RS reaches zero again. When RS reaches zero, the system can send another CM packet. (In the case where the EAP for CM packets precedes the EAP for traffic packets, when RS reaches zero, the system starts the timer and waits until the timer counts down to zero before sending the CM packet.) After the CM packet is sent, RS will hover between −50 and −45. (In the case where the EAP for CM packets follows the EAP for traffic packets, when RS reaches zero, the system sends the CM packet, starts the timer and waits until the timer counts down to zero. While the counter is active, the system freezes the value of RS.) Next, when there is a gap in traffic, RS increases until RS eventually reaches zero again. At this point, the system knows that the queue at the engine is empty, and the system can start processing another CM packet.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A network processor comprising:
an arbitration device configured to receive a first packet and a second packet, wherein the second packet includes a first control message;
at least one processing device; and
a pipeline comprising a plurality of access devices, wherein the plurality of access devices comprises a first access device and a second access device, wherein the pipeline is configured to, based on a clock signal, forward the first packet and the second packet between successive ones of the plurality of access devices, and
wherein the arbitration device is configured to
set a timer based on at least one of (i) an amount of time for data to travel between the first access device and the second access device, or (ii) a number of pipeline stages between the first access device and the second access device,
adjust a variable based on (i) the clock signal, and (ii) transmission of the first packet from the arbitration device to the pipeline, and
based on the timer and the variable, schedule transmission of the second packet through the pipeline.

2. The network processor of claim 1, wherein each of the pipeline stages refers to a portion of the pipeline between two successive ones of the plurality of access devices.

3. The network processor of claim 1, wherein the arbitration device is configured to:
increment a variable based on the clock signal;
in response to transmission of the first packet from the arbitration device to the pipeline, decrement the variable based on a size of the first packet; and
in response to transmission of the second packet from the arbitration device to the pipeline, decrement the variable based on a size of the second packet.

4. The network processor of claim 1, wherein:
the first packet identifies the first access device as the one of the plurality of access devices from which to send a first request signal to the at least one processing device;
the second packet identifies the second access device as the one of the plurality of access devices from which to send a second request signal to the at least one processing device;
the first access device is configured to, based on the first packet, transmit the first request signal to the at least one processing device; and
the second access device is configured to, based on the second packet, transmit the second request signal to the at least one processing device.

5. The network processor of claim 4, wherein:
the at least one processing device is configured to process the first request signal to generate a first response;
prior to the first packet proceeding along the pipeline from the first access device, one of the first access device and the at least one processing device is configured to incorporate the first response in the first packet;
the at least one processing device is configured to process the second request signal to generate a second response; and
prior to the second packet proceeding along the pipeline from the second access device, one of the second access device and the at least one processing device is configured to incorporate the second response in the second packet.

6. The network processor of claim 1, wherein:
the pipeline has an input and an output;
the arbitration device is configured to receive the first packet and the second packet from an interface;
the arbitration device is configured to forward the first packet and the second packet to the input of the pipeline; and
the output of the pipeline is configured to forward the first packet and the second packet to the interface.

7. The network processor of claim 1, wherein:
the plurality of access devices are connected in series along the pipeline; and
each of the plurality of access devices is configured to access the at least one processing device.

8. The network processor of claim 1, wherein the first access device is located successively after the second access device in the pipeline.

9. The network processor of claim 1, wherein the first access device is located successively after the second access device in the pipeline.

10. The network processor of claim 1, wherein:
the clock signal includes a plurality of clock cycles; and
the arbitration device is configured to periodically increment the variable a predetermined amount for each of the clock cycles of the clock signal, wherein the predetermined amount is set based on an amount of data transferred during each of the clock cycles of the clock signal and between (i) two successive ones of the plurality of access devices, or (ii) two separate stages of the pipeline.

11. The network processor of claim 1, wherein the arbitration device is configured to:
   subtract a size of the first packet from the variable in response to forwarding the second packet to the pipeline;
   determine whether to forward the second packet to the pipeline based on (i) the variable, (ii) a size of the second packet, and (iii) the timer; and
   in response to forwarding the second packet to the pipeline, subtracting the size of the second packet from the variable.

12. The network processor of claim 1, wherein if the second access device is located prior to the first access device in the pipeline, the arbitration device is configured to:
   allow the second packet to enter the pipeline;
   receive a third packet that indicates access to the at least one processing device at the second access device, wherein the third packet includes a second control message;
   in response to the variable being equal to a first predetermined value, (i) set the timer based on a number of pipeline stages between the first access device and the second access device, and (ii) start the timer, wherein the timer is configured to count down to a second predetermined value; and
   if the variable is equal to the first predetermined value and the timer is equal to the second predetermined value, allow the third packet to enter the pipeline.

13. The network processor of claim 1, wherein if the second access device is located after the first access device in the pipeline, the arbitration device is configured to:
   allow the second packet to enter the pipeline;
   receive a third packet that indicates access to the at least one processing device at the second access device, wherein the third packet includes a second control message;
   in response to the variable being equal to a first predetermined value, allow the third packet to enter the pipeline;
   in response to the third packet entering the pipeline, (i) set the timer based on a number of pipeline stages between the first access device and the second access device, and (ii) start the timer, wherein the timer is configured to count down to a second predetermined value;
   while the timer is counting down, maintain the variable at a same value; and
   in response to the timer counting down to the second predetermined value, permit the value of the variable to change.

14. The network processor of claim 1, wherein the first packet does not include a control message.

15. A method comprising:
   receiving a first packet and a second packet, wherein the second packet includes a first control message;
   based on a clock signal, forwarding the first packet and the second packet between successive ones of a plurality of access devices in a pipeline, wherein the plurality of access devices comprise a first access device and a second access device;
   setting a timer based on at least one of (i) an amount of time for data to travel between the first access device and the second access device, or (ii) a number of pipeline stages between the first access device and the second access device;
   adjusting a variable based on (i) the clock signal, and (ii) transmission of the first packet to the pipeline; and
   based on the timer and the variable, scheduling transmission of the second packet through the pipeline.

16. The method of claim 15, further comprising:
   incrementing the variable based on the clock signal;
   in response to transmission of the first packet to the pipeline, decrementing the variable based on a size of the first packet; and
   in response to transmission of the second packet to the pipeline, decrementing the variable based on a size of the second packet.

17. The method of claim 15, further comprising:
   transmitting a first request signal from the first access device to the at least one processing device based on the first packet, wherein the first packet identifies the first access device as the one of the plurality of access devices from which to send the first request signal to the at least one processing device;
   transmitting a second request signal from the second access device to the at least one processing device based on the second packet, wherein the second packet identifies the second access device as the one of the plurality of access devices from which to send the second request signal to the at least one processing device;
   processing the first request signal at the at least one processing device to generate a first response;
   prior to the first packet proceeding along the pipeline from the first access device, incorporating the first response in the first packet;
   processing the second request signal at the at least one processing device to generate a second response; and
   prior to the second packet proceeding along the pipeline from the second access device, incorporating the second response in the second packet.

18. The method of claim 15, further comprising:
   subtracting a size of the first packet from the variable in response to forwarding the second packet to the pipeline;
   determining whether to forward the second packet to the pipeline based on (i) the variable, (ii) a size of the second packet, and (iii) the timer; and
   in response to forwarding the second packet to the pipeline, subtracting the size of the second packet from the variable.

19. The method of claim 15, further comprising, if the second access device is located prior to the first access device in the pipeline:
   allowing the second packet to enter the pipeline;
   receiving a third packet that indicates access to the at least one processing device at the second access device, wherein the third packet includes a second control message;
   in response to the variable being equal to a first predetermined value, (i) setting the timer based on a number of pipeline stages between the first access device and the second access device, and (ii) starting the timer, wherein the timer is configured to count down to a second predetermined value; and
   if the variable is equal to the first predetermined value and the timer is equal to the second predetermined value, allowing the third packet to enter the pipeline.

20. The method of claim 15, further comprising, if the second access device is located after the first access device in the pipeline:
   allowing the second packet to enter the pipeline;

receiving a third packet that indicates access to the at least one processing device at the second access device, wherein the third packet includes a second control message;

in response to the variable being equal to a first predetermined value, allowing the third packet to enter the pipeline;

in response to the third packet entering the pipeline, (i) setting the timer based on a number of pipeline stages between the first access device and the second access device, and (ii) starting the timer, wherein the timer is configured to count down to a second predetermined value;

while the timer is counting down, maintaining the variable at a same value; and in response to the timer counting down to the second predetermined value, permitting the value of the variable to change.

\* \* \* \* \*